United States Patent
Goodman et al.

(10) Patent No.: US 9,060,075 B2
(45) Date of Patent: Jun. 16, 2015

(54) MOBILE PHONE/DOCKING STATION EMERGENCY CALL ROUTING

(75) Inventors: Lee N. Goodman, Tyngsboro, MA (US); Rezwanul Azim, Arlington, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 347 days.

(21) Appl. No.: 13/036,444

(22) Filed: Feb. 28, 2011

(65) Prior Publication Data

US 2012/0157032 A1  Jun. 21, 2012

Related U.S. Application Data

(63) Continuation-in-part of application No. 12/971,409, filed on Dec. 17, 2010.

(51) Int. Cl.
| | |
|---|---|
| H04W 4/00 | (2009.01) |
| H04L 12/66 | (2006.01) |
| H04L 12/28 | (2006.01) |
| G06F 15/177 | (2006.01) |
| H04M 11/04 | (2006.01) |
| H04W 76/00 | (2009.01) |

(52) U.S. Cl.
CPC ............ *H04M 11/04* (2013.01); *H04W 76/007* (2013.01)

(58) Field of Classification Search
CPC .............................. H04W 6/0077; H04W 4/22
See application file for complete search history.

(56) References Cited

U.S. PATENT DOCUMENTS

| | | |
|---|---|---|
| 6,148,074 A | 11/2000 | Miloslavsky et al. |
| 6,327,470 B1 | 12/2001 | Ostling |
| 7,110,789 B1* | 9/2006 | Curtiss et al. .............. 455/556.1 |
| 7,120,241 B1 | 10/2006 | Fuoss et al. |
| 7,143,198 B2* | 11/2006 | Lee et al. ........................... 710/2 |
| 7,400,886 B2 | 7/2008 | Sahim et al. |
| 2003/0039242 A1 | 2/2003 | Moore |
| 2005/0025129 A1 | 2/2005 | Meier |
| 2005/0090271 A1 | 4/2005 | Sylvain |
| 2005/0186960 A1 | 8/2005 | Jiang |
| 2005/0227666 A1* | 10/2005 | Cheng ........................ 455/404.1 |
| 2006/0120329 A1 | 6/2006 | Kim et al. |
| 2006/0187900 A1 | 8/2006 | Akbar |
| 2006/0229101 A1 | 10/2006 | LaBauve et al. |
| 2006/0242305 A1 | 10/2006 | Alnas |
| 2007/0189264 A1 | 8/2007 | Liu |
| 2008/0056472 A1* | 3/2008 | Tanemura et al. ........ 379/201.01 |
| 2008/0139222 A1* | 6/2008 | Falvo et al. ................ 455/456.3 |
| 2008/0278894 A1 | 11/2008 | Chen et al. |
| 2009/0001173 A1 | 1/2009 | Sevier et al. |
| 2009/0022301 A1 | 1/2009 | Mudaliar |
| 2009/0023442 A1 | 1/2009 | Ahmed et al. |
| 2009/0059907 A1 | 3/2009 | Sindhwani et al. |
| 2009/0097629 A1 | 4/2009 | Huslak et al. |
| 2009/0163139 A1 | 6/2009 | Wright-Riley |
| 2009/0305683 A1 | 12/2009 | Gupta et al. |
| 2010/0074247 A1 | 3/2010 | Clark et al. |
| 2010/0130169 A1 | 5/2010 | Narayanaswamy et al. |
| 2010/0157990 A1 | 6/2010 | Krzyzanowski et al. |
| 2011/0040858 A1* | 2/2011 | Gum ............................. 709/222 |

(Continued)

Primary Examiner — Melanie Jagannathan

(57) ABSTRACT

A client application installed at a mobile device determines whether the mobile device is docked in a docking station. The client application receives an indication of an emergency call being placed by a user of the mobile device. The client application selectively routes the emergency call either through a wired network or a wireless network based on whether the mobile device is docked in the docking station.

22 Claims, 12 Drawing Sheets

(56) References Cited

U.S. PATENT DOCUMENTS

| | | |
|---|---|---|
| 2011/0053643 A1 | 3/2011 | Shmunis |
| 2011/0098087 A1 | 4/2011 | Tseng |
| 2011/0206052 A1 | 8/2011 | Tan et al. |
| 2011/0287820 A1 | 11/2011 | Harrison et al. |
| 2012/0057565 A1 | 3/2012 | Mani |
| 2012/0303476 A1 | 11/2012 | Krzyzanowski et al. |

* cited by examiner

MOBILE PHONE/DOCKING STATION EMERGENCY CALL ROUTING

RELATED APPLICATION

The present application is a continuation-in-part (CIP) of U.S. application Ser. No. 12/971,409, entitled "Mobile Phone Docking Station for VoIP" and filed Dec. 17, 2010, the disclosure of which is hereby incorporated by reference herein in its entirety.

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, emergency calls may be selectively routed from a mobile device, such as a mobile phone, via multiple different network connections available to the mobile device. A client application installed at the mobile device may determine which of the multiple different network connections are available to the mobile device, and the client application may consult an emergency call routing table to identify which of the available network connections that the mobile device may use to send an emergency call. The mobile device may be docked in a docking station that enables the mobile device to route emergency calls via VoIP to an emergency contact point (e.g., to a Public Safety Answering Point (PSAP)) over a wired local area network (LAN) or wide area network (WAN) that is connected to the docking station. Additionally, the mobile device may have a wireless connection to a wireless cellular network that enables the mobile device to route emergency calls to an emergency contact point via the wireless cellular network connection. Furthermore, the mobile device may have a wireless connection to a wireless LAN/WAN (e.g., a Wi-Fi network) that enables the mobile device to route emergency calls via VoIP to an emergency contact point over the wireless LAN/WAN.

When consulting the emergency call routing table, the client application at the mobile device may additionally retrieve an emergency telephone number for the emergency contact point that corresponds to the network connection selected for routing the emergency call, may also retrieve an originating telephone number that identifies where the emergency call originated from, and may further retrieve location information associated with the location of the mobile device that may be used by the emergency contact point to direct emergency services to the user of the mobile device.

Figure 1:
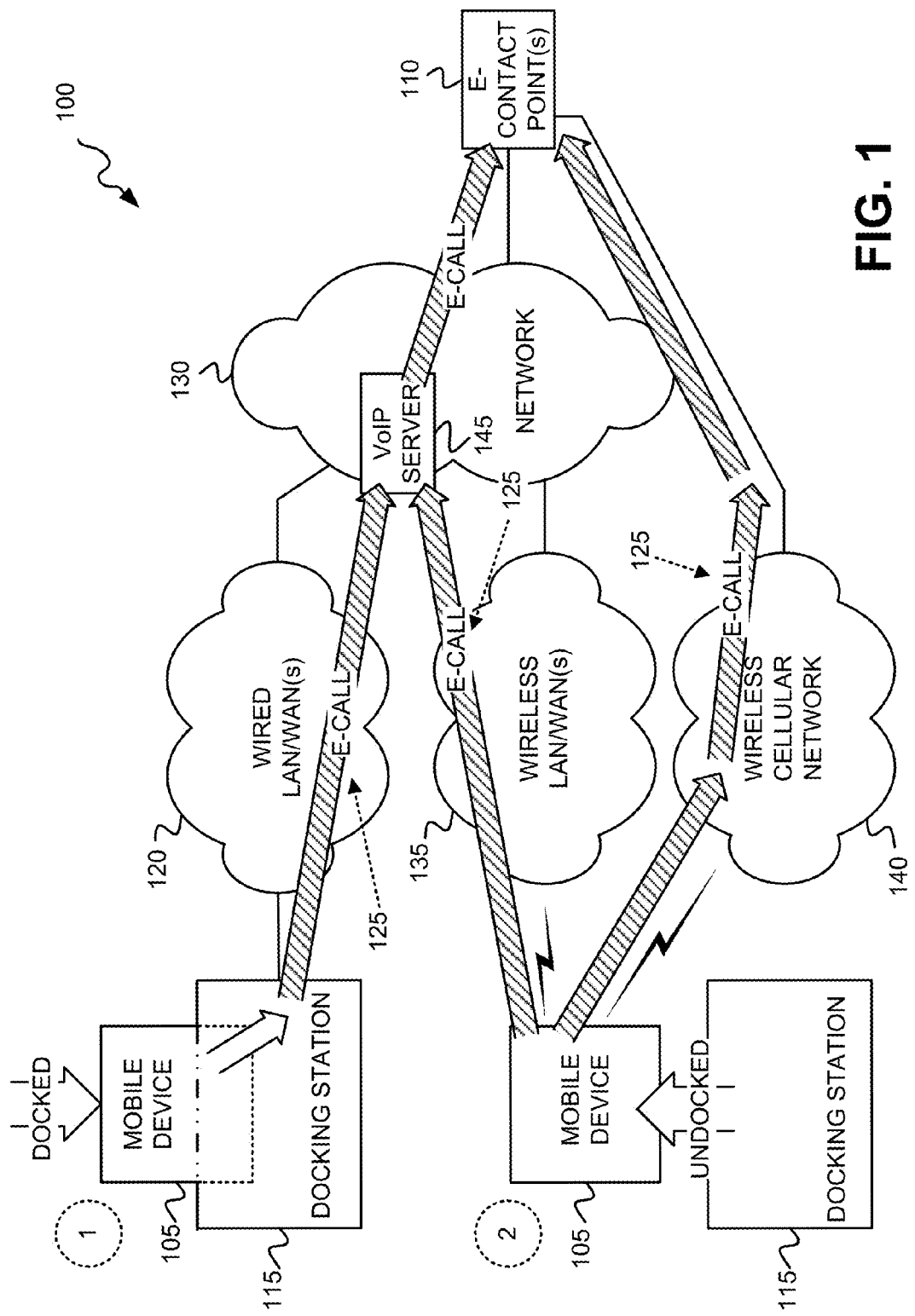
FIG. 1 is a diagram that depicts an exemplary network environment in which emergency call routing over different network connections from a mobile device may occur.

FIG. 1 is a diagram that depicts an exemplary network environment 100 in which a mobile device 105 may route an emergency call to an emergency contact point (e-contact point) via one of multiple different network connections. Mobile device 105 may include, for example, a cellular telephone (e.g., a smart phone), a tablet computer, a personal digital assistant (PDA), or other type of digital computing device that has the capability to communicate via multiple different network connections. FIG. 1 depicts examples of two different circumstances in which an emergency call may need to be routed from a mobile device 105 to an e-contact point 110. E-contact point 110 may include a Public Safety Answering Point (PSAP), or other type of emergency contact point (e.g., university dormitory security desk, campus security office, etc.).

In a first circumstance (depicted with a "1" within a circle), mobile device 105 is docked (e.g., physically inserted into a docking port) in a docking station 115. Docking station 115 may include a Voice over Internet Protocol (VOIP) phone that has a connection to a VoIP network and which also has a docking port which permits mobile device 105 to be "docked"

with docking station 115. While docked in docking station 115, a wired connection via a local area network (LAN)/wide area network (WAN) network 120 may be available to mobile device 105 via docking station 115. Therefore, a VoIP client application at mobile device 105 may determine that the wired connection is available via LAN/WAN network 120, and may route an emergency call 125 from mobile device 105 and through docking station 115 via a connection to wired LAN/WAN 120.

Wired LAN/WAN 120 may include a corporate LAN/WAN and/or other type of LAN/WAN (e.g., a home office LAN/WAN). The type of wired LAN/WAN used to route the emergency call may be dependent on the wired LAN/WAN to which docking station 115 is connected. Emergency call (e-call) 125 may traverse wired LAN/WAN 120 and a network 130 to reach e-contact point 110. Network 130 may include one or more networks that implement Ethernet protocol or Internet Protocol (IP). Network 130 may include a telecommunications network (e.g., a Public Switched Telephone Network (PSTN)), a local area network (LAN), a wide area network (WAN), a metropolitan area network (MAN), an intranet, the Internet, or a cable network (e.g., an optical cable network).

In a second circumstance (depicted with a "2" within a circle), mobile device 105 is undocked (e.g., physically removed from the docking port) from docking station 115. While undocked from docking station 115, a wireless connection may be available to mobile device 105 via a wireless LAN/WAN 135. Wireless LAN/WAN 135 may include a wireless LAN based on IEEE 802.11 standards (e.g., a "wi-fi" network), or based on other wireless standards. Alternatively, instead of a wireless LAN/WAN 135, network 135 may include a wireless cellular data network. The wireless cellular data network may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs) that further includes a packet-switched network, such as, for example, a General Packet Radio Service (GPRS), a Cellular Digital Packet Data (CDPD), or a Mobile IP network. Also, while undocked from docking station 115, a wireless connection may be available to mobile device 105 via a wireless cellular network 140. Therefore, the VoIP client application at mobile device 105 may determine that a wireless connection is available via wireless LAN/WAN 135 and may route emergency call 125 from mobile device 105 via a connection to wireless LAN/WAN 135. Wireless LAN/WAN 135 may include a corporate wireless LAN/WAN and/or other type of wireless LAN/WAN (e.g., a home office wireless network).

Emergency call 125 may traverse wireless LAN/WAN 135 and network 130 to reach e-contact point 110. Alternatively, the VoIP client application at mobile device 105 may determine that a wireless connection is available via wireless cellular network 140, and may route emergency call 125 from mobile device 105 via a connection to wireless cellular network 140. Emergency call 125 may traverse wireless cellular network 140 to reach e-contact point 110. Wireless cellular network 140 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs).

Thus, as shown in FIG. 1, an emergency call may be routed from mobile device 105 via one of multiple different network connections based on the availability of the network connections to the mobile device 105. In one exemplary implementation, the availability of a wired network connection via wired LAN/WAN 120 is based on whether mobile device 105 is docked in docking station 115. If not docked in docking station 115, then mobile device 105 may only use a wireless connection via wireless LAN/WAN 135 or wireless cellular network 140.

Figure 2A:
FIGS. 2A and 2B are diagrams that depict an exemplary docking station in which a mobile device may be docked.
Figure 2B:

FIGS. 2A and 2B depict an example of a physical configuration of docking station 115, mobile device 105, and a mobile device tray 200, and the physical interconnection of docking station 115, mobile device 105, and mobile device tray 200. Mobile device tray 200 may include a physical configuration that fits the external configuration of mobile device 105, such that mobile device 105 may be inserted into mobile device tray 200. In addition, mobile device 105's Universal Serial Bus (USB) port (or other connector ports) may interconnect with an appropriate physical and electrical port on mobile device tray 200. Subsequent to insertion of mobile device 105 into mobile device tray 200, tray 200 may be inserted into a docking port 210 of docking station 115 to complete the USB port interconnection between mobile device 105 and docking station 115. FIG. 2B depicts mobile device 105 inserted into docking port 210 of docking station 115. While docked in docking station 115, mobile device 105 may be used for controlling the operation of docking station 115. For example, if mobile device 105 has a touch panel display, then the touch panel display may be used for dialing a VoIP emergency call, instead of using a keypad on docking station 115.

Figure 3:
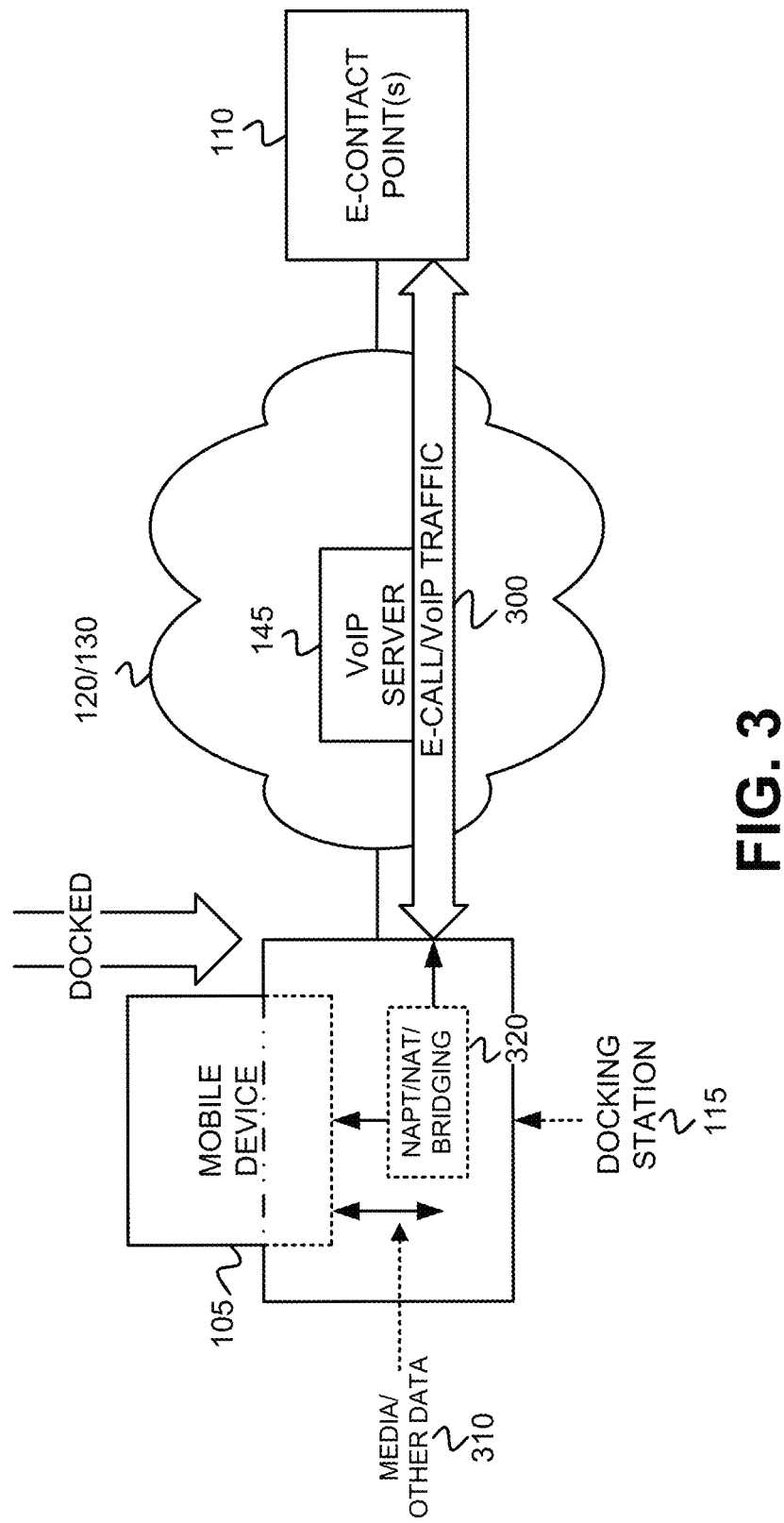
FIG. 3 is a diagram that depicts the exemplary docking station of FIG. 1 enabling a VoIP connection between a docked mobile device and an external network.

FIG. 3 depicts circumstance number "1" of FIG. 1, where mobile device 105 is docked with docking station 115, and mobile device 105 sends an emergency call using VoIP traffic 300 via wired LAN/WAN and network 130. As shown in FIG. 3, mobile device 105 may be docked (i.e., physically inserted into a docking port) with docking station 115. Upon being docked with docking station 115, mobile device 105 may exchange media (e.g., audio or video) or other data 310 with docking station 115. The exchanged media 310 may include audio streamed from a microphone of docking station 115 to mobile device 105, or from a microphone of mobile device 105 to docking station 115. The exchanged media may further include video streamed from a camera (or memory) of docking station 115 to mobile device 105, or from a camera (or memory) of mobile device 105 to docking station 115.

As further shown in FIG. 3, docking station 115 may connect to wired LAN/WAN 120 and network 130 for sending and/or receiving VoIP traffic 300 to/from mobile device 105 via VoIP server 145. Docking station 115 may forward VoIP traffic 300 from network 120/130 to mobile device 105, and from mobile device 105 to network 120/130 via a system 320 that implements NAPT, NAT, or a bridging mode. When implementing NAPT or NAT, system 320 may route packets associated with VoIP traffic 300 to/from mobile device 105. A side of docking station 115 facing network 120/130 may have a public, routable Internet Protocol (IP) address on network 120/130, while a side of docking station 115 facing mobile device 105 may have a statically configured private IP address. The routable IP address of docking station 115 facing network 120/130 may be statically configured, or may be obtained via the Dynamic Host Configuration Protocol (DHCP) from network 120/130. Mobile device 105 may have a statically configured private IP address (e.g., on a same network as the private IP address of docking station 115). Mobile device 105 may use the routable IP address of docking station 115 as a default gateway for sending VoIP packets to e-contact point 110 via network 120/130 and VoIP server 145. A physical and layer 2 connection between docking station 115 and mobile device 105 may include Ethernet over Universal Serial Bus (USB) (e.g., Ethernet frames encapsulated in USB packets). Media 310 may be streamed from the private IP address associated with mobile device 105 to the private IP address associated with docking station 115, or may be streamed in the reverse direction.

When implementing the bridging mode, system 320 may forward packets, at layer 2, from network 120/130, though docking station 115, to mobile device 105. Additionally, system 320 may forward packets, at layer 2, from mobile device 105, though docking station 115, to network 120/130. Docking station 115 may have an IP address, routable in network 120/130, and mobile device 105 may also have a different IP address that is routable in network 120/130. System 320, implementing the bridging mode, may forward packets received at docking station 115 from network 120/130 to the routable IP address of mobile device 105. Additionally, when implementing the bridging mode, system 320 may forward packets, received from mobile device 105 at the routable IP address of docking station 115, to network 120/130.

In some implementations, additional networks and/or network elements may be used, other than, or in addition to, networks 120 and 130 and VoIP server 145, to carry an e-call to e-contact point 110. For example, a gateway (not shown in FIG. 3) connecting networks 120/130 to a Public Switch Telephone Network (PSTN) may additionally be included for carrying an e-call from mobile device 105 to a PSAP e-contact point 110 via the PSTN. FIG. 3, therefore, may represent a simplified depiction of the networks and network elements that may be used for carrying an e-call to e-contact point 110.

Figure 4:
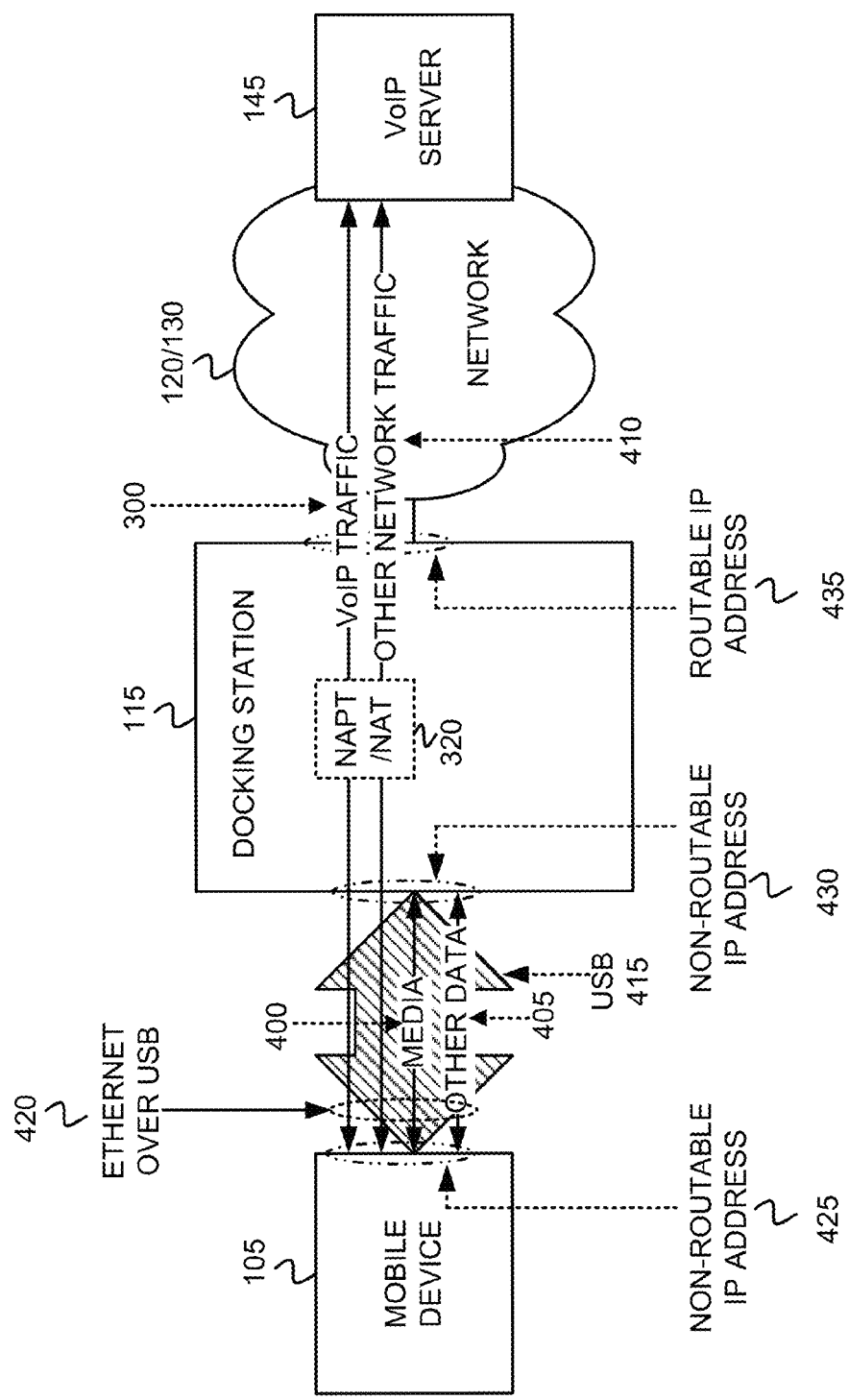
FIG. 4 is a diagram that depicts an exemplary implementation of the docking station of FIG. 1 in which the docking station implements Network Address and Port Translation or Network Address Translation for establishing a VoIP connection between a mobile device and an external network.

FIG. 4 is a diagram that depicts an exemplary implementation of docking station 115 of FIG. 1 in which docking station 115 implements NAPT or NAT for establishing a VoIP connection between mobile device 105 and network 120/130. When mobile device 105 is docked 115 into docking station 115, as shown in FIG. 1, media 400, other data 405, VoIP traffic 300 and other network traffic 410 may be sent to and from mobile device 105 via a Universal Serial Bus (USB) 415, as further shown in FIG. 4. Mobile device 105, therefore, acts as a USB peripheral, and docking station 115 acts as a USB host. Ethernet over USB protocol 420 may be used as the physical and layer 2 connection between docking station 115 and mobile device 105.

As shown in FIG. 4, mobile device 105 may have a statically configured IP address 425 that is non-routable from network 120/130 (but routable between IP address 430 of docking station 115 and IP address 425 of mobile device 105). As further shown in FIG. 4, docking station 115 may also have a statically configured IP address 430 that is non-routable from network 120/130 (but routable between IP address 430 of docking station 115 and IP address 425 of mobile device 105), where IP address 430 resides on a same private network (not shown) on which IP address 425 of mobile device 105 resides. A private network (not shown in FIG. 4), therefore, exists between mobile device 105 and docking station 115 via USB 415.

As further shown in FIG. 4, docking station 115 may have an IP address 435 that is routable from network 120/130. Routable IP address 435 may be statically configured, or may be obtained via the DHCP protocol from network 120/130. Docking station 115 may, therefore, act as a DHCP server to mobile device 105, thereby obtaining routable IP address 435 that may be used by network 120/130 to forward VoIP traffic 300 and other network traffic 410 to mobile device 105 via NAPT/NAT system 320. Non-routable, private IP address 425 on mobile device 105 and non-routable, private IP address 430 on docking station 115 may be statically configured prior to the connection of mobile device 105 to docking station 115 via USB 415. By having a routable IP address 435 on network 120/130, a network administrator may manage docking station 115 including, for example, providing software upgrades, firewall management, etc. The ability to address docking station 115 from network 120/130 may not be available when docking station 115 acts as an IP bridge (e.g., the exemplary bridging implementation of FIG. 5).

Media 400 may include audio or video data (e.g., streaming audio or video) that may be streamed from mobile device 105 for playback on docking station 115, or that may be streamed from docking station 115 for playback on mobile device 105. Media 400 may be streamed from mobile device 105 IP address 425 to docking station IP address 430, or from docking station IP address 430 to mobile device 105 IP address 425. Other data 405 may include keypad information (e.g., indications of keypad presses on docking station 115), status information (e.g., voicemail message indicator light, etc.), and other information that may be exchanged between mobile phone IP address 425 and docking station 115 IP address 430. Other data 405 may further include data other than audio or video data, such as, for example, web traffic data. The transfer of media 400 and/or other data 405 may be through sockets, such as Transmission Control Protocol (TCP) or User Datagram Protocol (UDP) sockets.

VoIP traffic 300 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through docking station 115 via NAPT/NAT system 320. NAPT/NAT system 320 may implement a forwarding table that forwards packets to/from mobile device 105 through docking station 115 to routable network 120/130. For VoIP applications, the forwarding table may be configured to pass SIP and RTP or RTCP traffic to/from mobile device 105 to routable network 120/130. Additionally, other network traffic 410 may be forwarded to/from mobile device 105 through docking station 115 to routable network 120/130 by the forwarding table based on NAPT or NAT filtering. Other network traffic 410 may include Internet traffic (e.g., web browsing), etc. The forwarding table of NAPT/NAT system 320 may receive packets from IP address 425 of mobile device 105 sent to routable IP address 435 of docking station 115, and may forward the packets to an appropriate next hop IP address in network 120/130 (e.g., to a next hop switch). The forwarding table of NAPT/NAT system 320 may further receive packets from an IP address in network 120/130 sent to routable IP address 435, and may forward the packets to non-routable IP address 425 of mobile device 105. A network administrator of network 120/130 may designate what kinds of traffic are permissible, and the forwarding table at docking station 115 may be configured appropriately (e.g., e-mail and web browsing may be forwarded whereas other undesirable traffic may be blocked during the forwarding process). A forwarding table implemented at mobile device 105 may use routable IP address 435 of docking station 115 as the default gateway address for all outgoing packets.

Figure 5:
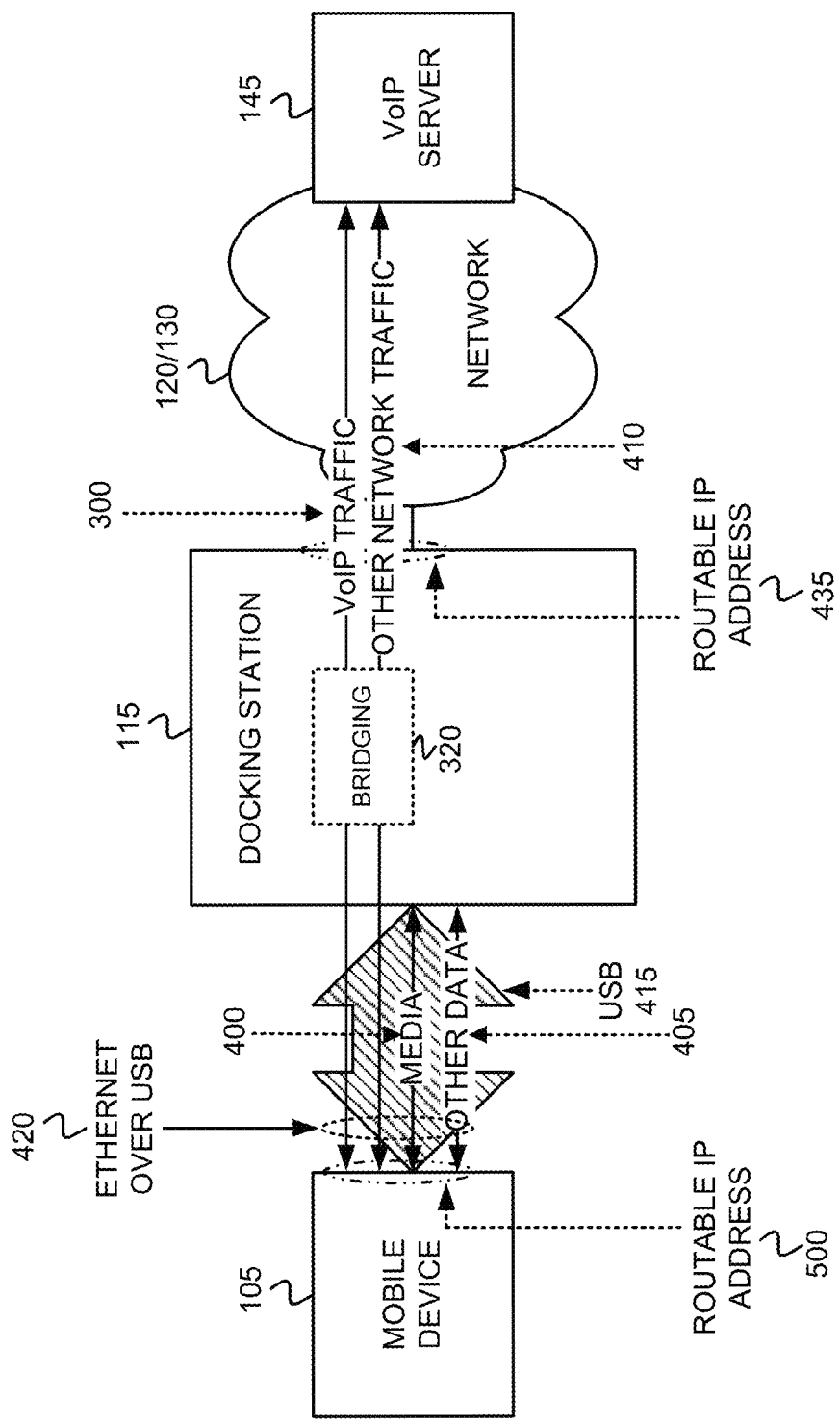
FIG. 5 is a diagram that depicts an exemplary implementation of the docking station of FIG. 1 in which the docking station implements a bridging mode for establishing a VoIP connection between the mobile device and an external network.

FIG. 5 is a diagram that depicts an exemplary implementation of docking station 115 of FIG. 1 in which docking station 115 implements a bridging mode for establishing a VoIP connection between mobile device 105 and network 120/130. When mobile phone 105 is docked into docking station 115, as shown in FIG. 1, media 400, other data 405, VoIP traffic 300 and other network traffic 410 may be sent to and from mobile device 105 via a Universal Serial Bus (USB) 415, as further shown in FIG. 5. Mobile device 105, therefore, acts as a USB peripheral, and docking station 115 acts as a USB host. Ethernet over USB protocol 420 may be used as the physical and layer 2 connection between docking station 115 and mobile device 105.

As shown in FIG. 5, mobile device 105 may have an IP address 500 that is routable from network 120/130. As further shown in FIG. 5, docking station 115 may also have a IP address 435 that is routable from network 120/130. Routable IP addresses 500 and 435 may be statically configured, or may be obtained via the DHCP protocol from network 120/130. Docking station 115 may, therefore, act as a DHCP server to mobile device 105, thereby obtaining routable IP addresses 500 and 435 that may be used by network 120/130 to forward VoIP traffic 300 and other network traffic 410 to mobile device 105 via bridging system 320.

Media 400 may be streamed from mobile device 105 for playback on docking station 115, or may be streamed from docking station 115 for playback on mobile device 105. Media 400 may be streamed from mobile device 105 IP address 500 to docking station IP address 435, or from docking station IP address 435 to mobile device 105 IP address 500. Other data 405 may include keypad information, status information, and other information that may be exchanged between mobile device IP address 500 and docking station 115 IP address 435.

VoIP traffic 300 may include VoIP signaling traffic (e.g., SIP traffic) and VoIP media traffic (e.g., RTP or RTCP) and may be forwarded through docking station 115 via bridging system 320. Bridging system 320 may forward, at layer 2, packets to/from mobile device 105 through docking station 115 to routable network 120/130. Bridging system 320 may "transparently" forward packets, without any NAPT or NAT filtering as performed in the implementation of FIG. 4, from mobile device 105 to network 120/130 and from network 120/130 to mobile device 105. For example, if network 130 includes an Ethernet Local Area Network (LAN), bridging system 320 may forward Ethernet frames from network 120/130 to mobile device 105 based on MAC addresses contained in the Ethernet frames.

Figure 6:
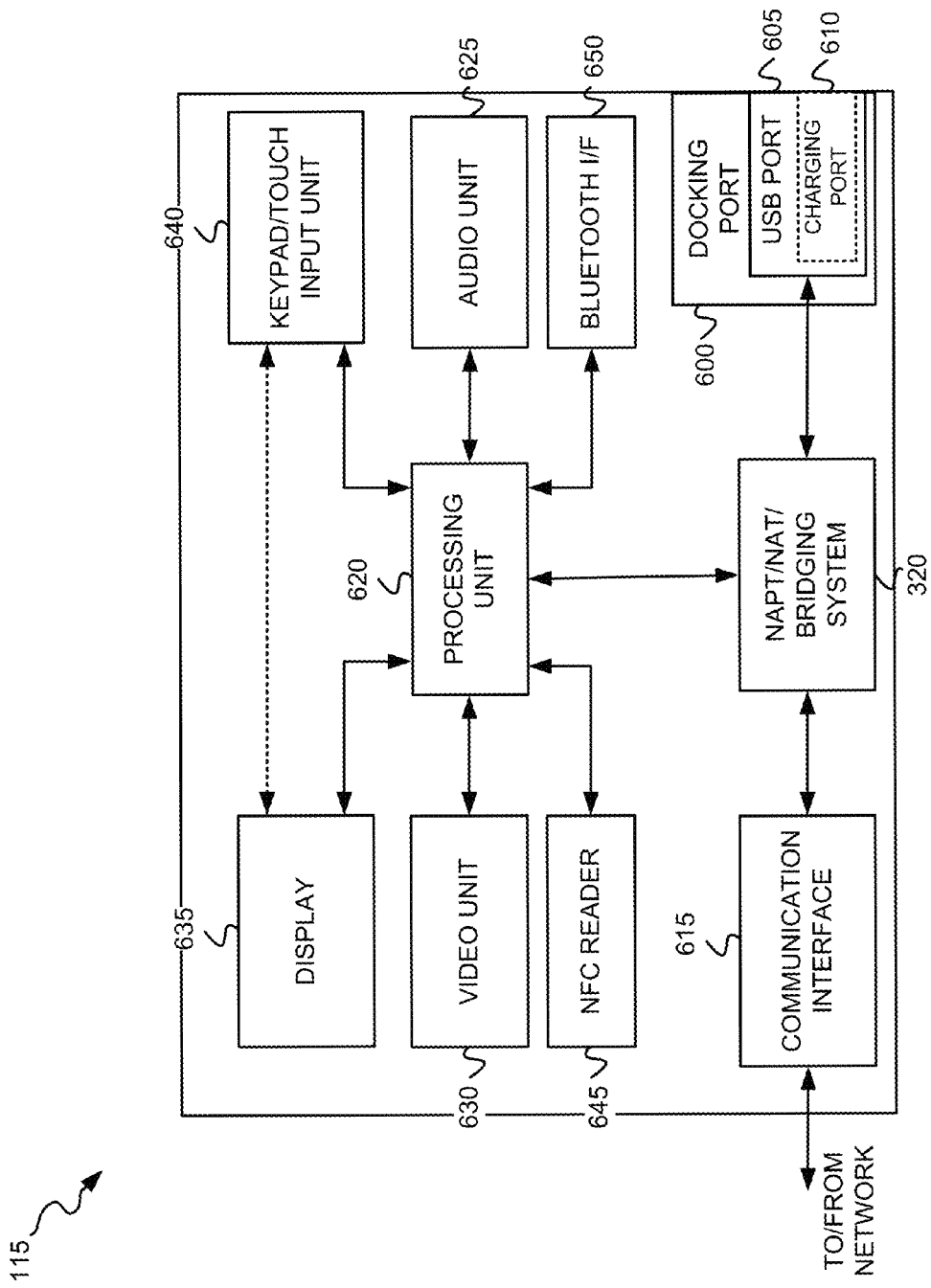
FIG. 6 is a diagram that depicts exemplary components of the docking station of FIG. 1.

FIG. 6 is a diagram that depicts exemplary components of docking station 115. Docking station 115 may include docking port 210, NAPT/NAT/Bridging system 320, a communication interface 615, a processing unit 620, an audio unit 625, a video unit 630, a display 635, a keypad/touch input 640, a Near Field Communication (NFC) reader 645, and a Bluetooth interface 650.

Docking port 210 may include a port that may physically engage with a tray into which mobile device 105 is inserted. The shape and size of docking port 210 may be different based on a different external configuration of mobile device 105. Docking port 210 may further include a USB port 605, which also includes a charging port 610 (i.e., USB port 605 may simultaneously act as a data port and a battery charging port). Though a single USB port 605 is depicted in FIG. 6, docking station 115 may include multiple USB ports (not shown) and/or a USB hub. Charging port 605 may include an electrical connection for supplying a charging current to a battery of mobile device 105. USB port 610 may include an electrical connection for the USB that may interconnect docking station 115 with mobile device 105.

NAPT/NAT/bridging system 320 may include, in one exemplary implementation that corresponds to FIG. 4 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 320, when implementing NAPT or NAT, may be used to firewall and control traffic sent to mobile device 105 via docking station 115, thus, enhancing the security of, and control over, traffic carried by the docked mobile device 105. NAPT/NAT/bridging system 320 may include, in another exemplary implementation that corresponds to FIG. 5 above, a SOC that implements a bridging mode which may forward packets, at layer 2, from network 120/130, though docking station 115, to mobile device 105. Additionally, the SOC implementing the bridging mode may forward packets, at layer 2, from mobile device 105, though docking station 115, to network 120/130.

Communication interface 615 may include a transceiver for communicating with network 120/130. Processing unit 620 may include a processor, microprocessor, or processing logic that may interpret and execute instructions. The instructions may be stored in memory (not shown), such as, for example, a random access memory (RAM), a Read Only Memory (ROM), or another type of dynamic or static storage device that may store information and instructions for execution by processing unit 620.

Audio unit 625 may include a microphone for receiving audio input into docking station 115, and may include mechanisms for playback of audio data received from the microphone, or received from mobile device 105. Video unit 630 may include a camera for capturing video, and may further include mechanisms for playback of video data received from the camera, or received from mobile device 105. Display 635 may include a display device that may display video data or other types of data associated with the operation of docking station 115 or mobile device 105. In some implementations, display 630 may include a touch screen display that registers touch input at different locations upon the touch screen. Keypad/touch input unit 640 may include an alphanumeric keypad and mechanisms for receiving indications of touch input from display 630.

NFC reader 645 may include a short range, high frequency system that enables the short range (e.g., 10 cm) exchange of data with mobile device 105. When mobile device 105 is placed in proximity to docking station 115 (e.g., device 105 is inserted into docking port 210), NFC reader 645 may "read" phone identity information from a corresponding NFC system located in device 105. In addition to phone identity information, NFC reader 645 may also read phone user identity information from the corresponding NFC system located in device 105. NFC reader 645 may, thus, be used to identify different phones that may be placed in proximity to docking station 115. Bluetooth interface 650 may include a short wavelength system for connecting with, and exchanging data over short distances, with any type of Bluetooth enabled device. Bluetooth interface 650 may, for example, connect with a Bluetooth enabled audio headset that permits a wearer to listen to audio from audio unit 625.

The configuration of components of docking station 115 illustrated in FIG. 6 is for illustrative purposes only. Other configurations may be implemented. Therefore, docking station 115 may include additional, fewer and/or different components than those depicted in FIG. 6. For example, docking station 115 may include a system(s) for implementing an Ethernet switch (not shown in FIG. 6), and/or for implementing Virtual Local Area Networks (VLANs). Docking station 115 may further include a magnetic sensor that may detect the insertion of mobile device 105 into docking port 210 and may thereby initiate various functions at docking station 115 or at mobile device 105 (e.g., initiate execution of a VoIP application at mobile device 105, etc.).

Figure 7:
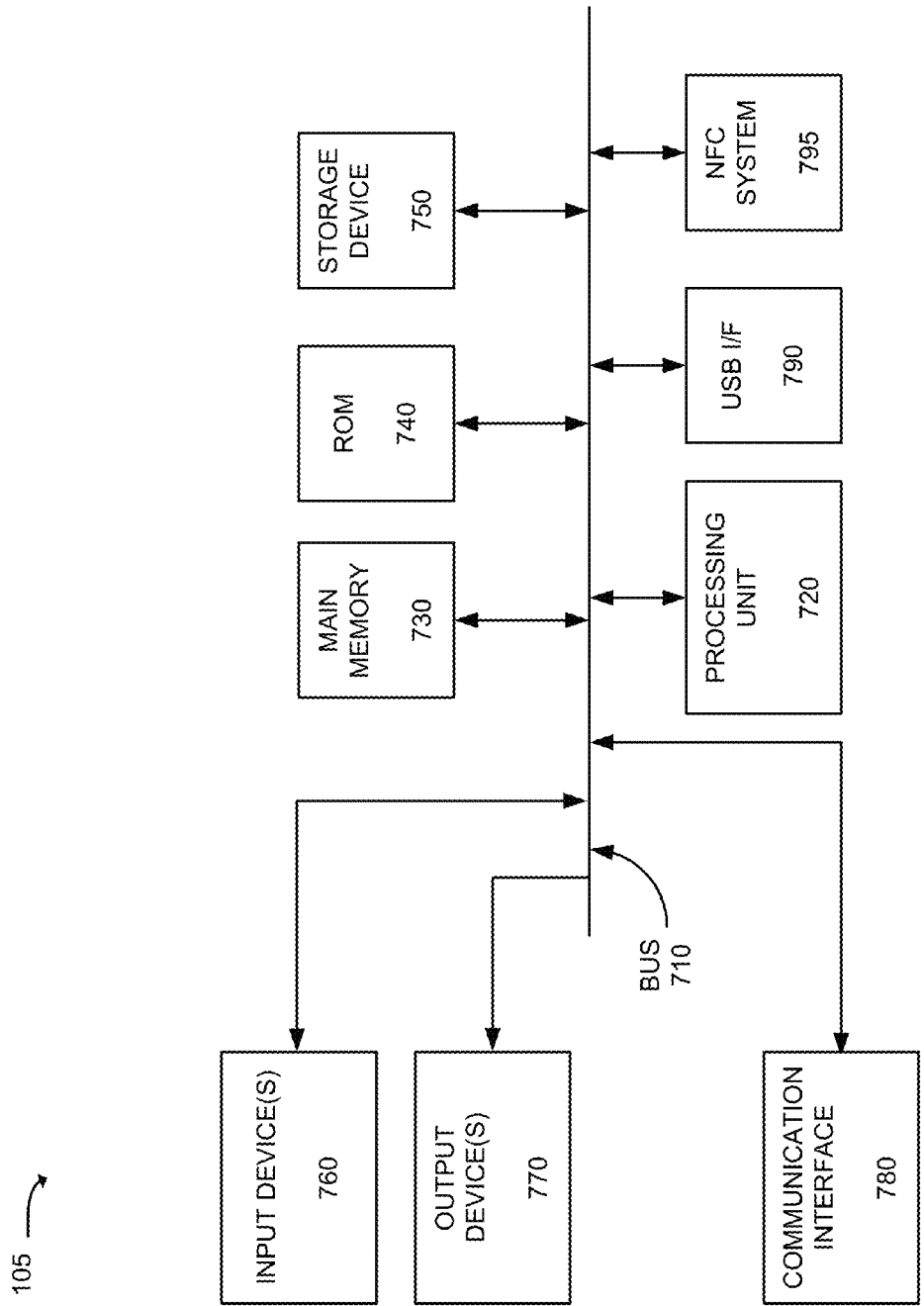
FIG. 7 is a diagram that depicts exemplary components of the mobile device of FIG. 1.

FIG. 7 is a diagram that depicts exemplary components of mobile device 105. Mobile device 105 may include a bus 710, a processing unit 720, a main memory 730, a read only memory (ROM) 740, a storage device 750, an input device(s) 760, an output device(s) 770, a communication interface 780, a USB interface 790, and a NFC system 795. Bus 710 may include a path that permits communication among the elements of mobile device 105.

Processing unit 720 may include a processor, microprocessor, or processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium.

Input device 760 may include one or more mechanisms that permit an operator to input information to mobile device 105, such as, for example, a keypad or a keyboard, voice recognition and/or biometric mechanisms, etc. Output device 770 may include one or more mechanisms that output information to the operator, including a display, a speaker, etc. Communication interface 780 may include any transceiver mechanism that enables mobile device 105 to communicate with other devices and/or systems. For example, communication interface 780 may include a radio frequency transceiver for communicating via a PLMN or satellite network of network 130. USB I/F 790 may include interconnection mechanisms to permit mobile device 105 to physically and electrically connect with USB port 605 of docking station 115. NFC system 795 may include a short range, high frequency system that enables the short range exchange of data with mobile device 105. When mobile device 105 is placed in proximity to docking station 115 (e.g., device 105 is inserted into docking port 210), NFC system 795 may transmit phone identity information and/or phone user identity information that may be "read" by NFC reader 645 of docking station 115.

The configuration of components of mobile device 105 illustrated in FIG. 7 is for illustrative purposes only. Other configurations may be implemented. Therefore, mobile device 105 may include additional, fewer and/or different components than those depicted in FIG. 7. For example, mobile device 105 may include a GPS unit that may be used for determining a location of mobile device 105.

Figure 8:
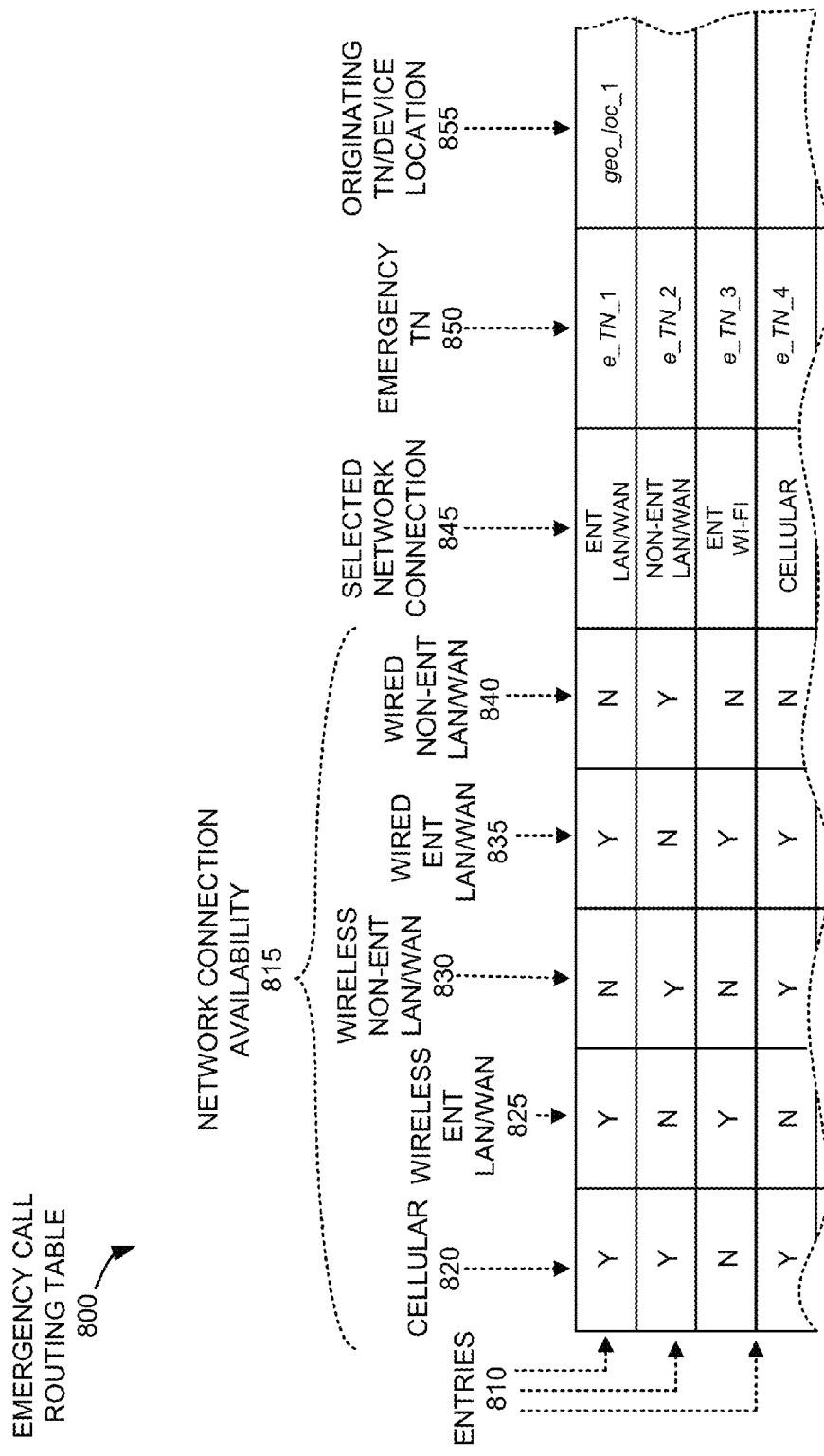
FIG. 8 is a diagram the illustrates an exemplary emergency call routing table that may be stored at the mobile device of FIG. 1.

FIG. 8 depicts an exemplary emergency call routing table 800 that may be stored in memory of mobile device 105. For example, emergency call routing table 800 may be stored in main memory 730, or storage device 750, of mobile device 105. Emergency call routing table 800 may include multiple table entries 810, each of which may include multiple fields 815 related to network connection availability, a selected network connection field 845, an emergency telephone number (TN) field 850, and an originating telephone number/device location field 855.

Network connection availability fields 815 may include a cellular network availability field 820, a wireless enterprise (ENT) LAN/WAN availability field 825, a wireless non-enterprise (non-ENT) LAN/WAN availability field 830, a wired enterprise LAN/WAN availability field 835, and a wired non-enterprise LAN/WAN availability field 840. Cellular network availability field 820 may indicate whether a network connection is available to mobile device 105 via wireless cellular network 140. Wireless enterprise LAN/WAN availability field 825 may indicate whether a network connection is available to mobile device 105 via wireless LAN/WAN 135, where wireless LAN/WAN 135 includes a corporate LAN/WAN (i.e., an "enterprise" LAN/WAN) that may be maintained and/or operated by a network operator that maintains and operates wireless cellular network 140. Wireless non-enterprise LAN/WAN availability field 830 may indicate whether a network connection is available to mobile device 105 via wireless LAN/WAN 135, where wireless LAN/WAN 135 includes a LAN/WAN that is a non-corporate, or non-enterprise, LAN/WAN. For example, wireless LAN/WAN 135 may include a home wireless LAN. Alternatively, wireless LAN/WAN 135 may include a wireless LAN operated by an entity other than the operator of wireless cellular network 140 (e.g., an airport wireless LAN). Wired enterprise LAN/WAN availability field 835 may indicate whether a network connection is available to mobile device 105 via wired LAN/WAN 120, where wired LAN/WAN 120 includes a wired corporate LAN/WAN that may be maintained and/or operated by a network operator that maintains and operates wireless cellular network 140. Wired non-enterprise LAN/WAN availability field 840 may indicate whether a network connection is available to mobile device 105 via wired LAN/WAN 120, where wired LAN/WAN 120 includes a wired non-corporate, or non-enterprise, LAN/WAN. For example, wired LAN/WAN 120 may include a home wired LAN. Alternatively, wired LAN/WAN 120 may include a wired LAN operated by an entity other than the operator of wireless cellular network 140.

Selected network connection field 845 may identify a network connection through which an emergency call may be routed. Emergency TN 850 field may identify the emergency telephone of e-contact point 110 to which the emergency call may be routed. Originating TN/device location field 855 may identify the telephone number from which the emergency call may originate and/or may identify the location of mobile device 105 when the emergency call is initiated. Field 855 may, therefore, specify the telephone number from which the emergency call can be identified as originating. Field 855 may also specify various location information associated with the location of mobile device 105 and/or docking station 115. The location information may include a hierarchy of location information, including the following: Global Positioning System (GPS) information, location information based on wireless triangulation and/or signal strength, Switch Medium Access Control (MAC) and port number associated with the location of docking station 115, RJ45 static IP address (e.g., MAC address or IP address range), or location information obtained from a location fingerprinting algorithm.

A client application at mobile device 105 may identify which network connections are available to mobile device 105, and may use indicators of the network connection availability to index emergency call routing table 800 to identify an entry 810. For example, if the client application at mobile device 105 identifies a cellular network connection, a wireless enterprise LAN/WAN connection and a wired enterprise LAN/WAN connection as being available to mobile device 105, then the client application may index into the first entry 810 shown in table 800 in FIG. 8, to retrieve "Ent LAN/WAN" from selected network connection field 845, emergency telephone number "e_TN__1" from field 850, and "geo_loc__1" from field 855.

Figure 9:
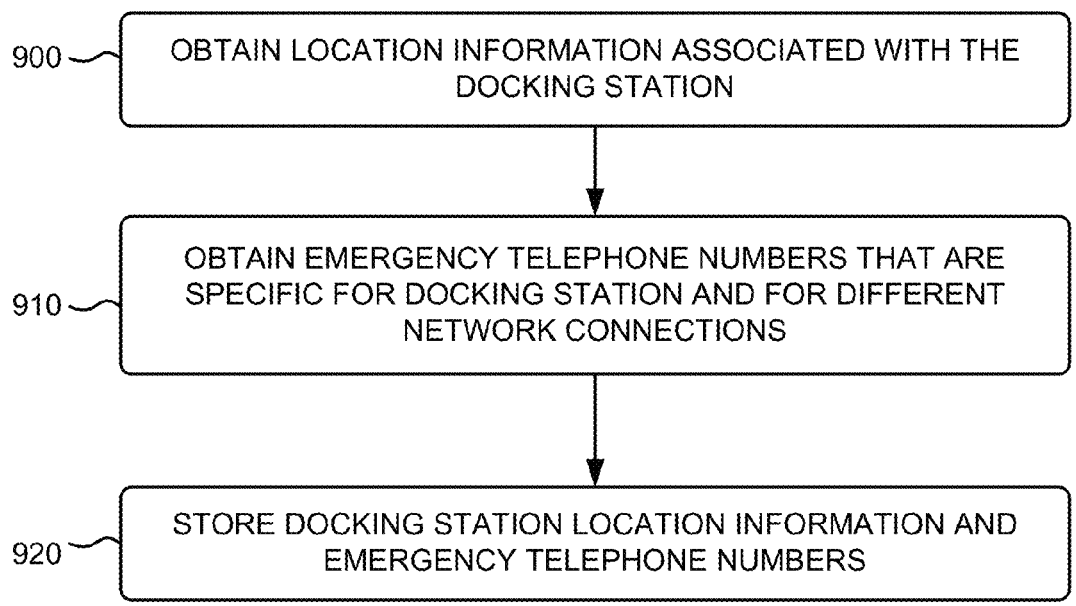
FIG. 9 is a flow diagram that illustrates an exemplary process for obtaining location information and emergency telephone numbers for storage at the docking station of FIG. 1.

FIG. 9 is a flow diagram that illustrates an exemplary process for obtaining location information and emergency telephone numbers for storage at docking station 115. The exemplary process of FIG. 9 may be implemented by docking station 115.

The exemplary process may include obtaining location information associated with docking station 115 (block 900). The location information may be obtained from mobile device 105 (or other source), from an external network connected to docking station 115 (e.g., wired LAN/WAN 120, wireless LAN/WAN 135, or wireless cellular network 140). The location information may include GPS location information obtained from mobile device 105, location information obtained from wireless LAN/WAN via signal strength measurement techniques, or location information obtained from wireless cellular network 140 using signal triangulation techniques. The location information may additionally include network information, such as, for example, a switch MAC address and port number associated with the location of docking station 115, or a RJ45 static IP address associated with docking station 115. The location information may also be obtained from a location fingerprinting algorithm.

Docking station 115 may obtain emergency telephone numbers that are specific for docking station 115 and for different network connections (block 910). The emergency telephone numbers may be obtained from various sources, including being provisioned by a network administrator, or obtained directly by docking station from e-contact point 130. A different emergency telephone number may be obtained for each different network connection that may be available to mobile device 105, when mobile device 105 is docked with docking station 115, or un-docked from docking station 115. For example, a first emergency telephone number may be obtained for an available network connection to wired LAN/WAN 120, and a second emergency telephone number may be obtained for an available network connection to wireless cellular network 140.

Docking station 115 may store the obtained location information and emergency telephone numbers in memory (block 920). For example, docking station 115 may store the obtained location information and emergency telephone numbers in a memory device of docking station 115.

Figure 10:
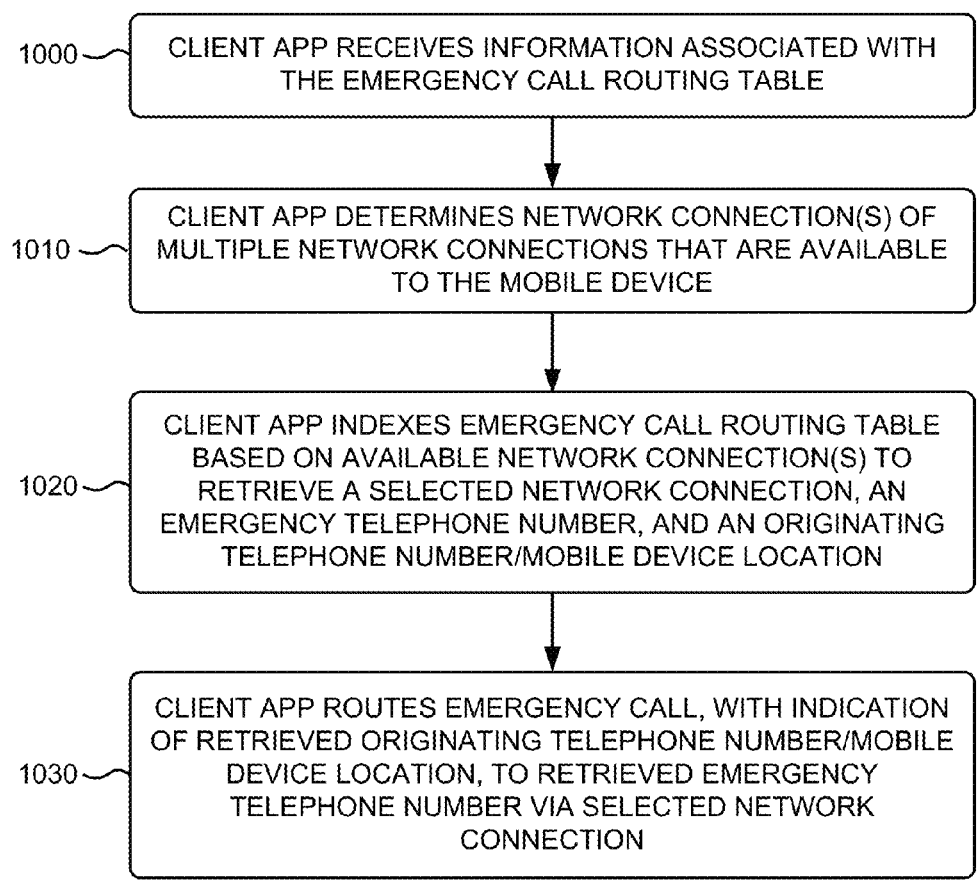
FIG. 10 is a flow diagram that illustrates an exemplary process for routing an emergency call from the mobile device to the emergency contact point of FIG. 1 via one of multiple different network connections that may be available to the mobile device.

FIG. 10 is a flow diagram that illustrates an exemplary process for routing an emergency call from mobile device 105 to e-contact point 110 via one of multiple different network connections that may be available to mobile device 105. The exemplary process of FIG. 10 may be implemented by a client application of mobile device 105. The description of the exemplary process of FIG. 10 below may refer to the exemplary messaging diagram of FIG. 11.

Figure 11:
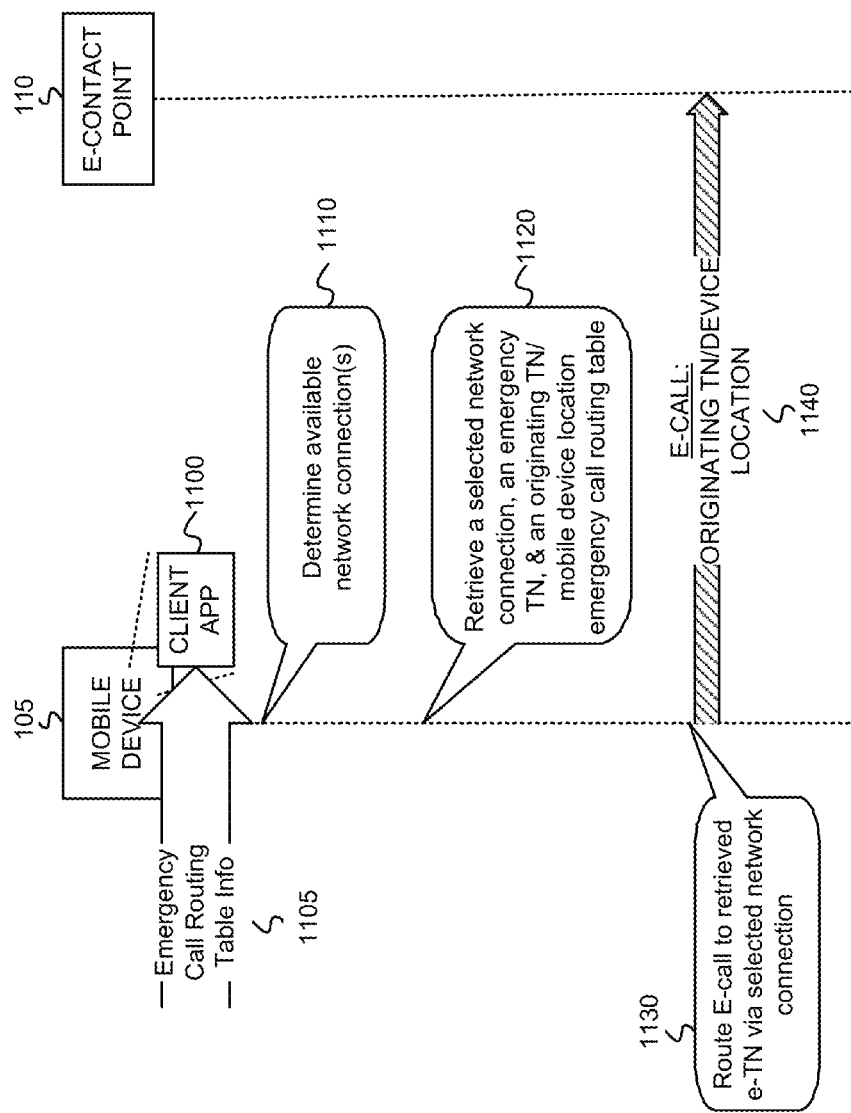
FIG. 11 is a diagram that illustrates exemplary messaging associated with the exemplary process of FIG. 10.

The exemplary process may include a client application receiving information associated with emergency call routing table 800 (block 1000). As shown in FIG. 11, a client application 1100 at mobile device 105, which may initiate VoIP calls, including emergency calls, may receive emergency call routing table information 1105. The emergency call routing table information 1105 may be received from docking station 115 (e.g., stored in block 920 of FIG. 9). Additional information for storing in table 800 may be received from a network administrator, or other entity. Such additional information may populate selected network connection fields 845, and originating telephone number fields 855 of entries 810. A network administrator, the user of docking station 115, or other entity may implement a rule set in table 800, where each table entry 810 effectively implements a rule that maps a set of available network connections to a specific value for selected network connection field 845, emergency TN field 850, and originating TN/device location field 855.

The client application may determine the network connection(s) of multiple network connections that are available to mobile device 105 (block 1010). For example, the client application may determine whether mobile device 105 is docked in docking station 115 and, therefore, has a connection to wired LAN/WAN 120 available to it. As another example, the client application may determine whether mobile device 105 has an available connection to an enterprise or non-enterprise wireless LAN/WAN 135, or an available connection to wireless cellular network 140. FIG. 11 depicts client application 1100 determining 1110 the network connections that are available to mobile device 105. Determining the network connection(s) of the multiple network connections may include identifying Internet Protocol (IP) addresses associated with selected ones of the network connections and comparing those IP addresses with known ranges of IP addresses. For example, a certain range of IP addresses may be associated with a connection to an enterprise wired LAN/WAN, and another, non-overlapping range of IP addresses may be associated with a connection to a non-enterprise LAN/WAN. As another example, a certain range of IP addresses may be associated with a connection to an enterprise wireless LAN/WAN, and another, non-overlapping range of IP addresses may be associated with a connection to a non-enterprise LAN/WAN.

The client application may index emergency call routing table 800 based on the determined available network connection(s) to retrieve a selected network connection, an emergency telephone number, and an originating telephone number and/or mobile device location (block 1020). For example, referring to table 800 of FIG. 8, if the client application determines that a wireless cellular network connection is available ("Y" in field 820), a wireless enterprise LAN/WAN network connection is available ("Y" in field 825), a wireless non-enterprise LAN/WAN network connection is not available ("N" in field 830), a wired enterprise LAN/WAN network connection is available ("Y" in field 835), and a wired non-enterprise LAN/WAN network connection is not available ("N" in field 840), then the client application may index into the first entry of table 800 to retrieve "Ent LAN/WAN" from selected network connection field 845, "e_TN__1" from emergency TN field 850, and "geo_loc__1" from originating TN/device location field 855. FIG. 11 depicts client application 1100 retrieving 1120 a selected network connection, an emergency telephone number and an originating telephone number/mobile device location from the emergency call routing table.

The client application may route an emergency call, with an indication of the retrieved originating telephone number and/or mobile device location, to the retrieved emergency telephone number via the selected network connection (block 1030). Upon entry of an emergency call by the user of mobile device 105, the client application may route the emergency call to e-contact point 110 at the emergency telephone number retrieved from emergency TN field 850 via the network connection retrieved from selected network connection field 845. The user of mobile device 105 may initiate an emergency call via, for example, a keypad of docking station 115, or via, for example, a touch screen of mobile device 105. The client application may use the telephone number retrieved from field 855 as the telephone number from which the emergency call originates. The client application may additionally include, in signaling or overhead data associated with the call, a location of mobile device 105 retrieved from field 855. FIG. 11 depicts client application 1100 routing the e-call 1140 to the retrieved emergency telephone number via the selected network connection. As shown, the routed e-call 1140 may include the originating telephone number and/or the location of mobile device 105.

Exemplary embodiments described herein enable the selective routing of emergency calls from a mobile device via multiple different network connections available to the mobile device to an emergency contact point. The mobile device may determine which of multiple different network connections are available to the mobile device, and may select which one of the available network connections that the mobile device may use to send an emergency call to the emergency contact point. Exemplary embodiments herein, therefore, permit emergency calls to be made from a mobile device via a wireless connection to a cellular network and/or VoIP over a wireless or wired LAN/WAN.

The foregoing description of implementations provides illustration and description, but is not intended to be exhaustive or to limit the invention to the precise form disclosed. Modifications and variations are possible in light of the above teachings or may be acquired from practice of the invention.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
storing, at a mobile device, an emergency call routing table that implements a rule set;
receiving an indication of an emergency call being placed by a user of the mobile device;
determining a set of different network connections, among multiple network connections, that are available for connection to the mobile device, wherein each of the multiple different network connections comprises a connection via a different communication network of multiple communication networks;
indexing the emergency call routing table with the determined set of different network connections to locate an entry of the emergency call routing table that implements a rule of the rule set to map the determined set of different network connections to each of a selected network connection of the multiple different network connections, an emergency telephone number, and an originating telephone number or mobile device location;
retrieving the selected network connection, the emergency telephone number and the originating telephone number or the mobile device location from the located table entry; and
routing, from the mobile device, the emergency call to the retrieved emergency telephone number via the selected network connection and a corresponding one of the multiple different communication networks.

2. The method of claim 1, wherein the mobile device comprises a digital computing device having a capability to communicate via multiple different network connections.

3. The method of claim 2, wherein the mobile device comprises a cellular telephone, a tablet computer, or a personal digital assistant (PDA).

4. The method of claim 1, wherein the indication of the emergency call being placed by the user is received at the mobile device via a touch screen of the mobile device or via a keypad of a docking station with which the mobile device is docked.

5. The method of claim 1, wherein the different network connections are available for connection to the mobile device based on whether the mobile device is docked with a docking station.

6. The method of claim 5, wherein, if the mobile device is docked with the docking station, then a wireless cellular network connection, a wired local area network (LAN)/wide area network (WAN) network connection, and a wireless local area network (LAN)/wide area network (WAN) connection are available to the mobile device.

7. The method of claim 6, wherein, if the mobile device is not docked with the docking station, then the wireless cellular network connection and the wireless LAN/WAN are available to the mobile device.

8. The method of claim 1, wherein the multiple network connections comprise at least one wired network connection and at least one wireless network connection and wherein the at least one wireless network connection comprises a wireless local area network (LAN)/wide area network (WAN) network connection and a wireless cellular network connection.

9. A system, comprising:
a memory configured to store:
a client application, and
an emergency call routing table;
a processing unit configured to execute the client application to:
receive an indication of an emergency call being placed at a mobile device,
determine different network connections, among multiple network connections, that are available for connection to the mobile device, wherein the different network connections are available for connection to the mobile device based on whether the mobile device is docked with a docking station and wherein the multiple network connections comprise a wireless cellular network connection, a wireless enterprise local area network (LAN)/wide area network (WAN) connection, a wireless non-enterprise LAN/WAN connection, a wired enterprise LAN/WAN connection, and a wired non-enterprise LAN/WAN connection,
index the emergency call routing table with the different network connections that are determined to be available for connection to the mobile device to retrieve a selected one of the different network connections, an emergency telephone number, and an originating telephone number or mobile device location, wherein the selected one of the different network connections comprises one of the wireless cellular network connection, the wireless enterprise LAN/WAN connection, the wireless non-enterprise LAN/WAN connection, the wired enterprise LAN/WAN connection, or the wired non-enterprise LAN/WAN connection, and
route the emergency call to the emergency telephone number via the selected one of the different network connections.

10. The system of claim 9, wherein the system comprises the mobile device.

11. The system of claim 10, wherein the mobile device comprises a cellular telephone, a tablet computer, or a personal digital assistant (PDA).

12. The system of claim 9, wherein the system further comprises a docking station and wherein the docking station comprises a docking port configured to physically dock with the mobile device and includes:
- a Universal Serial Bus (USB) port configured to connect with the docked mobile device, wherein the USB port further includes a charging port configured to supply a charging current to a battery of the docked mobile device.

13. The system of claim 9, wherein, if the mobile device is docked with a docking station, then:
- the wireless cellular network connection, the wired enterprise LAN/WAN network connection, and the wireless enterprise LAN/WAN connection are available to the mobile device, or
- the wireless cellular network connection, the wired non-enterprise LAN/WAN network connection, and the wireless non-enterprise LAN/WAN connection are available to the mobile device.

14. The system of claim 13, wherein, if the mobile device is not docked with the docking station, then:
- the wireless cellular network connection and the wireless enterprise LAN/WAN are available to the mobile device, or
- the wireless cellular network connection and the wireless non-enterprise LAN/WAN are available to the mobile device.

15. A non-transitory computer-readable medium containing instructions executable by at least one processor, the non-transitory computer-readable medium comprising:
- one or more instructions for storing, at a mobile device, an emergency call routing table that implements a rule set;
- one or more instructions for receiving an indication of an emergency call at the mobile device;
- one or more instructions for determining different network connections, among multiple network connections, that are available for connection to the mobile device, wherein each of the multiple different network connections comprises a connection via a different communication network of multiple communication networks;
- one or more instructions for indexing an emergency call routing table with the determined set of different network connections to locate an entry of the emergency call routing table that implements a rule of the rule set to map the determined set of different network connections to each of a selected network connection of the multiple different network connections, an emergency telephone number, and an originating telephone number or mobile device location;
- one or more instructions for retrieving the selected network connection, the emergency telephone number and the originating telephone number or the mobile device location from the located table entry; and
- one or more instructions for routing an emergency call to the emergency telephone number via the selected network connection and a corresponding one of the multiple different communication networks.

16. The non-transitory computer-readable medium of claim 15, wherein the multiple network connections comprise at least one wired network connection and at least one wireless network connection.

17. The non-transitory computer-readable medium of claim 16, wherein the at least one wireless network connection comprises a wireless local area network (LAN)/wide area network (WAN) network connection or a wireless cellular network connection.

18. The non-transitory computer-readable medium of claim 16, wherein the at least one wireless network connection comprises a wireless local area network (LAN)/wide area network (WAN) network connection and a wireless cellular network connection.

19. The non-transitory computer-readable medium of claim 16, wherein the at least one wired network connection comprises a wired local area network (LAN)/wide area network (WAN) network connection.

20. The non-transitory computer-readable medium of claim 15, wherein the different network connections are available for connection to the mobile device based on whether the mobile device is docked with a docking station.

21. The non-transitory computer-readable medium of claim 20, wherein, if the mobile device is docked with the docking station, then a wireless cellular network connection, a wired local area network (LAN)/wide area network (WAN) network connection, and a wireless local area network (LAN)/wide area network (WAN) connection are available to the mobile device.

22. The non-transitory computer-readable medium of claim 21, wherein, if the mobile device is not docked with the docking station, then the wireless cellular network connection and the wireless LAN/WAN are available to the mobile device.

* * * * *